US008997596B2

(12) United States Patent
Bergström et al.

(10) Patent No.: US 8,997,596 B2
(45) Date of Patent: Apr. 7, 2015

(54) INTERLOCKING DEVICE IN A VEHICLE TRANSMISSION (75) Inventors: Klas Bergström, Västra Frölunda (SE); Anders Hedman, Marstrand (SE)

(73) Assignee: Volvo Lastvagnar AB, Göteborg (SE)

( * ) Notice: Subject to any disclaimer, the term of this patent is extended or adjusted under 35 U.S.C. 154(b) by 652 days.

(21) Appl. No.: 13/320,259

(22) PCT Filed: May 11, 2010

(86) PCT No.: PCT/EP2010/002880
§ 371 (c)(1),
(2), (4) Date: Dec. 21, 2011

(87) PCT Pub. No.: WO2010/130407
PCT Pub. Date: Nov. 18, 2010

(65) Prior Publication Data
US 2012/0118095 A1 May 17, 2012

Related U.S. Application Data (60) Provisional application No. 61/177,418, filed on May 12, 2009.

(51) Int. Cl.
*G05G 5/08* (2006.01)
*F16H 63/36* (2006.01)
(Continued)

(52) U.S. Cl.
CPC ............ *F16H 63/36* (2013.01); *Y10T 74/2011* (2015.01); *F16H 3/006* (2013.01); *F16H 3/0915* (2013.01); *F16H 61/688* (2013.01); *F16H 2063/3079* (2013.01); *F16H 2312/08* (2013.01)

(58) Field of Classification Search
USPC .............................. 74/330, 335, 340, 473.12, 74/473.24–473.26, 473.36, 473.37
See application file for complete search history.

(56) References Cited

U.S. PATENT DOCUMENTS 2,001,783 A * 5/1935 Heck et al. .................... 192/48.4
2,953,035 A * 9/1960 Herr, Jr. ...................... 74/473.26
(Continued)

FOREIGN PATENT DOCUMENTS

DE 8122318 U1 12/1981

OTHER PUBLICATIONS

International Search Report for corresponding. International Application PCT/EP2010/002880.

(Continued)

*Primary Examiner* — Ha D Ho
(74) *Attorney, Agent, or Firm* — WRB-IP LLP (57) ABSTRACT An interlocking device arranged to prevent forbidden order of engagement/disengagement of two tooth clutches in a vehicle transmission is provided and includes a groove arranged in a first of shift rods, and a second and a third groove arranged in a second of shift rods, an interlocking element arranged coplanar with the shift rods, and directed and movable towards the shift rods. The length of the interlocking element is adapted to allow certain combinations and order of engagement/disengagement of the tooth clutches. A piston element partitions the second and third groove. The piston element is movably arranged in a hole in the second shift rod such that the interlocking element can push the piston element down in the hole, allowing the second shift rod to be displaced only one-way when the first shift rod is in an engaged position.

8 Claims, 5 Drawing Sheets (51) Int. Cl.
*F16H 3/00* (2006.01)
*F16H 3/091* (2006.01)
*F16H 61/688* (2006.01)
*F16H 63/30* (2006.01)

(56) References Cited

U.S. PATENT DOCUMENTS

| | | | | |
|---|---|---|---|---|
| 3,301,078 A | * | 1/1967 | Michael | 74/333 |
| 3,780,602 A | * | 12/1973 | Thornley | 477/99 |
| 4,068,537 A | * | 1/1978 | Wolfe | 74/473.11 |
| 4,120,212 A | * | 10/1978 | Philipsen | 74/473.21 |
| 4,852,421 A | * | 8/1989 | Kerboul | 74/473.21 |
| 5,150,628 A | * | 9/1992 | Alfredsson | 74/330 |
| 5,309,787 A | * | 5/1994 | Soyka et al. | 74/527 |
| 5,947,202 A | * | 9/1999 | Gazewood | 166/301 |
| 5,966,989 A | | 10/1999 | Reed, Jr. et al. | |
| RE39,598 E | | 5/2007 | Markyvech | |
| 7,540,209 B2 | * | 6/2009 | Scheib et al. | 74/335 |
| 8,752,442 B2 | * | 6/2014 | Hedman et al. | 74/330 |
| 2005/0274218 A1 | * | 12/2005 | Birkel et al. | 74/473.24 |
| 2008/0127760 A1 | * | 6/2008 | John et al. | 74/335 |
| 2008/0245167 A1 | | 10/2008 | Gitt | |
| 2009/0139355 A1 | * | 6/2009 | Cho | 74/335 |
| 2012/0111685 A1 | * | 5/2012 | Bergstrom et al. | 192/3.63 |
| 2012/0118095 A1 | * | 5/2012 | Bergstrom et al. | 74/473.25 |
| 2013/0081492 A1 | * | 4/2013 | Hedman et al. | 74/335 |

OTHER PUBLICATIONS

International Preliminary Report on Patentability for corresponding International Application PCT/EP2010/002880.

* cited by examiner

|     | R1 | R2 | 1 | 2 | 3 | 4 | 3↔R2 |
|-----|----|----|---|---|---|---|------|
| 121 | •  |    | • |   | • |   | ○    |
| 122 |    | •  |   | • |   | • | ○    |
| 170 | •  | •  |   |   |   |   | •    |
| 140 |    |    | • | • |   |   |      |
| 150 | •  |    | • |   |   | • |      |
| 160 |    |    |   |   | • | • | •    |

INTERLOCKING DEVICE IN A VEHICLE TRANSMISSION

BACKGROUND AND SUMMARY

The present invention relates to vehicle transmissions, especially with automatic gear shifting, and more particularly to a device for preventing a certain order of the engagement/disengagement of tooth clutches.

The conventional stepped transmission for rear-wheel drive vehicles can be regarded as a robust, compact and cost-effective product. A typical example of such a lay-out is shown in FIG. 2 in DE10242823A1. An input shaft is coaxial with a main (output) shaft and parallel with a countershaft. A gearwheel that is rotationally fixed on the input shaft meshes with a gearwheel that is rotationally fixed on the countershaft. Several pairs of meshing gearwheels are then located side by side. In each of these pairs, one gearwheel is coaxial with the countershaft; the other is coaxial with the main shaft. One of these gearwheels is rotationally fixed on its coaxial shaft. The other gearwheel, the loose gearwheel, is free to rotate relative to its coaxial shaft, but can be rotationally locked to the shaft by a mechanical tooth clutch. This construction is used for manually shifted transmissions as well as for automated mechanically engaged transmissions, AMTs. Because of the mechanical tooth clutches, there will during the shift be an interruption of the power transfer between the engine and the driven wheels of the vehicle. Thus, this type of transmission is not power-shifting.

If the loose gearwheels in two gearwheel pairs at the same time would be locked rotationally to their shafts, the transmission would be blocked and the shafts therein could not rotate. This could lead to damage, e.g., broken gear or clutch teeth, and must be prevented. In manual transmissions, the dominant "H-type" shift pattern enables straightforward design of the shift control system to prevent blocked shafts. In AMTs, blocked shafts can be prevented by proper software, at least under normal conditions. However, in case of faults, e.g., on sensors and/or valves, blocking of shafts could possibly occur. In some designs, this is prevented by designing the automatic shift actuation system similar to a manual one, with one actuator corresponding to longitudinal motion of the shift lever and one actuator corresponding to sideways motion. Such a design might in addition reduce the number of components, but is, in general, not able to allow as quick shifts as a system with one actuator for each tooth clutch. In order to prevent blocked shafts, those latter systems often have an interlocking pin between grooves in the shift actuation parts of two tooth clutches. The length of this pin is adapted to allow one tooth clutch, but not both, engaged. This is a simple, robust and cost-effective design.

Dual clutch transmissions are an interesting crossbreed between power-shifting planetary transmissions and conventional stepped transmissions with power interruption at gear shifts. In principle, a dual clutch transmission has two input shafts, each connectable with a friction clutch to the output shaft of the engine. Functionally, this is equivalent to having two conventional transmissions in parallel and using one at a time for power transfer. The parallel transmission that is not used, idling, for the time being, can have a gear engaged and prepared for a subsequent shift. This shift is carried out by simultaneously disengaging the friction clutch of the previously used parallel transmission and engaging the friction clutch of the previously idling parallel transmission.

When properly designed, dual clutch transmissions have a potential of providing power-shifts at a reasonable production cost and low power losses. This is due to the fact that the rotating parts, i.e., gearwheels, shafts and tooth clutches, are similar to those in conventional stepped transmissions. This, furthermore, enables the use of the same production equipment. So, it makes sense to produce dual clutch transmissions in the same facilities as used for conventional stepped transmissions.

Dual clutch transmissions for rear wheel drive vehicles often have two separate countershafts, one connected to each input shaft. One example is found in U.S. Pat. No. 5,150,628. These countershafts make the transmission considerably wider than a conventional stepped transmission. That may lead to difficulties in installing the transmission into the vehicle. However, in some dual clutch transmission designs there is only one countershaft, e.g., as in DE923402, DE3131156A1 and DE102005044068A1. On this countershaft there are loose gearwheels arranged that can be rotationally connected to each other and to the countershaft by means of mechanical tooth clutches. In a way, this can be regarded as if the second countershaft is arranged coaxial to the first one. The result will be a power-shiftable dual clutch transmission that is not wider than a corresponding conventional stepped transmission. However, the tooth clutches on the countershaft make it more difficult to prevent blocking of shafts. Often, some combinations of the states of three or four tooth clutches may give blocked shafts, whereas other combinations are used for ordinary power transfer. Similar conditions can be found also for dual clutch transmissions that have two separate countershafts. An effective way to prevent blocked shafts in such complex transmissions is to use shift barrels for controlling the tooth clutches, e.g., as in U.S. Pat. No. 5,966,989. Unfortunately, shift barrels normally only allow sequential shifting, i.e., from one gear to the adjacent higher or lower. Multi-step shifts are not possible, in general. Another alternative is to use an active shift blocking system, e.g., as in U.S.RE. 39,598E. That would, however, increase the complexity and cost significantly. For preventing blocked shafts, mechanical systems that involve more than two tooth clutches tend to be complex, cf. US2006/0230861A1, especially if the tooth clutches are arranged on different shafts.

US2009139355 discloses a dual clutch transmission with means for blocking gear changes. The transmission may include: a control bar including a hole; a first shift rail and a second shift rail that are respectively disposed along the control bar; first springs biasing the first rail and the second rail respectively; a first stop and a second stop that are mounted in respective inner grooves of the first rail and the second rail; second springs that elastically support the stops and insert the stops into the hole according to the movement of the rails. Spring loaded stops will engage with one of the shift forks in a predetermined fork position in order to prevent an undesired gear shift. However, these means only prevent undesirable states of two tooth clutches that would give blocking of shafts.

DE 8122318 U1 discloses an interlocking device (FIG. 1-3) arranged to prevent forbidden order of engagement/disengagement of two tooth clutches in a vehicle transmission, where each tooth clutch when in engaged position is arranged to rotationally lock a first shaft to a gearwheel or to a second shaft and when in a disengaged position to rotationally unlock said first shaft from said gearwheel or said second shaft, where for each tooth clutch a shift rod (1, 2) is arranged to push said tooth clutch between an engaged and disengaged position, and where said interlocking device comprises:

a groove (7) arranged in a first (1) of said shift rods, and a second and a third groove (7, 8) arranged in a second (2) of said shift rods, an interlocking element (10) arranged coplanar with said shift rods, and directed and movable towards said shift rods;

and where length of said interlocking element is adapted to allow certain combinations and order of engagement/disengagement of said tooth clutches.

It is desirable to further develop an interlocking device for tooth clutches in a vehicle transmission.

It is desirable to provide a simple, reliable and cost-effective mechanical device to only allow engagement/disengagement of two different tooth clutches in a certain order.

According to a first aspect of the invention, there is provided an interlocking device arranged to prevent forbidden order of engagement/disengagement of two tooth clutches in a vehicle transmission, where each tooth clutch when in engaged position is arranged to rotationally lock a first shaft to a gearwheel or to a second shaft and when in a disengaged position to rotationally unlock said first shaft from said gearwheel or said second shaft, where for each tooth clutch a shift rod is arranged to push said tooth clutch between an engaged and disengaged position. The interlocking device comprises:

a groove arranged in a first of said shift rods, and a second and a third groove arranged in a second of said shift rods, an interlocking element arranged coplanar with said shift rods, and directed and movable towards said shift rods;

and where length of said interlocking element is adapted to allow certain combinations and order of engagement/disengagement of said tooth clutches. The device is characterized in that an element partitions said second and third groove and where said element is movably arranged in a hole in said second shift rod such that the interlocking element can push the element down in said hole, allowing the second shift rod to be displaced only one-way when the first shift rod is in an engaged position.

Said device acts between two tooth clutches, only.

Thereby, a cost-efficient compromise between mechanical complexity and shaft-blocking prevention can be achieved. Said device does not prevent the transmission from being used in a normal way.

According to one embodiment of the invention said hole is slanted.

According to another embodiment of the invention said element is a piston slidably arranged in said slanted hole.

According to a further embodiment of the invention said hole is straight and perpendicular to said shift rods.

According to another embodiment of the invention said element is hinged to said second shift rod by a hinge.

According to a further embodiment of the invention said element is of a lid-like design.

According to another embodiment of the invention said element is pushed towards said grooves by a spring element.

According to a further embodiment of the invention said interlocking element is an interlocking pin.

BRIEF DESCRIPTION OF THE FIGURES

The present invention will be described in greater detail below with reference to the accompanying figures which, for the purpose of exemplification, show further preferred embodiments of the invention and also the technical background, and in which.

DETAILED DESCRIPTION

Figure 1A:
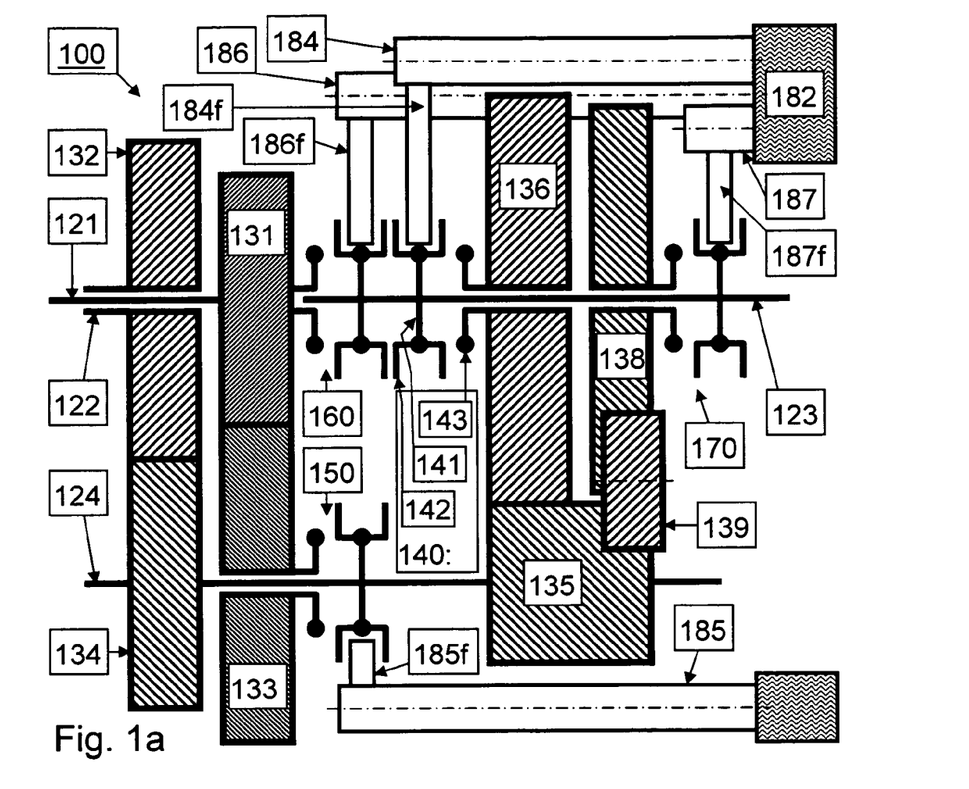
FIGS. 1a, 2a, 2b, 3a and 3b diagrammatically show different configurations of transmissions.

FIG. 1a shows schematically a dual clutch main transmission 100. There is a first input shaft 121 and a coaxial second input shaft 122. Each of those input shafts can be drivably connected to a prime mover by a dual frictional clutch unit (not shown). A main and output shaft 123 is arranged coaxial to input shafts 121 and 122. A countershaft 124 is arranged parallel thereto.

A first input shaft gearwheel 131 is integral or rotationally fixed with the first input shaft 121. Similarly, a second input shaft gearwheel 132 is integral or rotationally fixed with the second input shaft 122. The first input shaft gearwheel 131 is in mesh with a primary countershaft loose gearwheel 133 that is arranged on the countershaft 124. A second countershaft primary gearwheel 134 is integral or rotationally fixed with the countershaft 124 and in mesh with the second input shaft gearwheel 132. A countershaft secondary gearwheel 135 is integral or rotationally fixed with the countershaft 124 and meshes with a secondary loose gearwheel 136 rotatably arranged on the main and output shaft 123. The countershaft secondary gearwheel 135 is also in mesh with a reverse idler gearwheel 139, which also meshes with a reverse loose gearwheel 138 rotatably arranged on the main and output shaft 123.

The secondary loose gearwheel 136 can selectably be rotationally locked by a first tooth clutch 140 to the main and output shaft 123. The first tooth clutch 140 comprises schematically a hub 141 that is integral or rotationally fixed with the main and output shaft 123, an engaging sleeve 142 that is rotationally locked but axially moveable relative the main and output shaft 123, and a set of clutch teeth 143 on the secondary loose gearwheel 136. Similarly, a countershaft tooth clutch 150 can selectably rotationally lock the primary countershaft loose gearwheel 133 to the countershaft 124. Furthermore, the first input shaft 121 can selectably be rotationally locked to the main and output shaft 123 by a direct tooth clutch 160. Finally, a reverse tooth clutch 170 can selectably rotationally lock the reverse loose gearwheel 138 and main and output shaft 123.

The tooth clutches 140, 150, 160 and 170 are controlled by an actuator unit, schematically referred to as 182, via shift rods 184, 185, 186 and 187 and shift forks 184f, 185f, 186f and 187f, respectively.

Figure 1B:
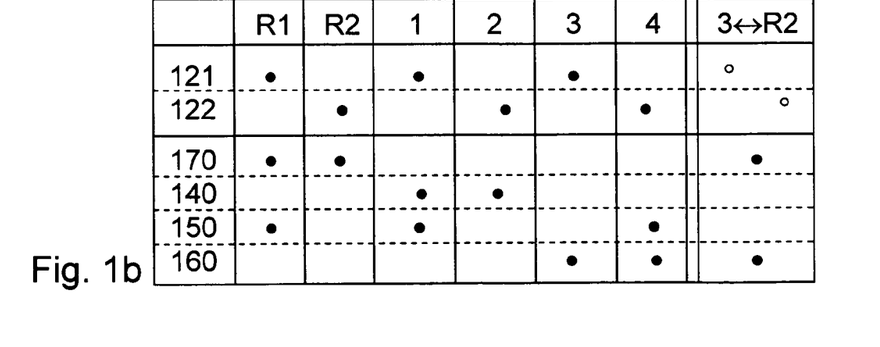
FIG. 1b discloses a table over how different possible gears can be engaged.

FIG. 1b shows how different gears 1 to 4 and R1 and R2 are achieved in the transmission 100. A dot indicates active input shaft and engaged tooth clutch. When gear 2 or 3 is active, the adjacent higher or lower gear may be preselected in the idling, inactive sub-transmission. The right-most column represents a special case. There, gear 3 is preselected in the sub-transmission that is driven by the first input shaft 121. In the other sub-transmission, the one driven by the second input shaft 122, the reverse gear R2 is preselected. Thereby, shifts between forward and reverse gears can be carried out rapidly and repeatedly by simply controlling the dual clutch unit. This is a feature shared by several transmissions that have more than one frictional clutch. It can be very helpful, for instance when the vehicle wheels are stuck in snow or mud. Then, repeated forward and reverse inching of the vehicle is often employed for releasing the stuck wheels. This is usually referred to as "rocking".

In FIG. 1a it can be seen that the shafts would be blocked by a simultaneous engagement of the three tooth clutches 140, 150 and 160. That would connect the first input shaft 121 to the main and output shaft 123 in two ways; directly with the direct tooth clutch 160 and indirectly via the first input shaft gearwheel 131, primary countershaft loose gearwheel 133, countershaft tooth clutch 150, countershaft 124, countershaft secondary gearwheel 135, secondary loose gearwheel 136 and first tooth clutch 140. This corresponds to the following logical expression that should be prevented:

(140engaged) AND (150engaged) AND (160engaged)

In the same way, the shafts would be blocked by a simultaneous engagement of the tooth clutches 150, 160 and 170. The corresponding logical expression is:

(150engaged) AND (160engaged) AND (170engaged)

These two logical expressions can be combined into one:

[(140engaged) OR (170engaged)] AND (150engaged) AND (160engaged)

A mechanical device that prevents this would most probably be fairly complex, especially since the countershaft tooth clutch 150 is arranged on the countershaft 124.

Figure 2A:
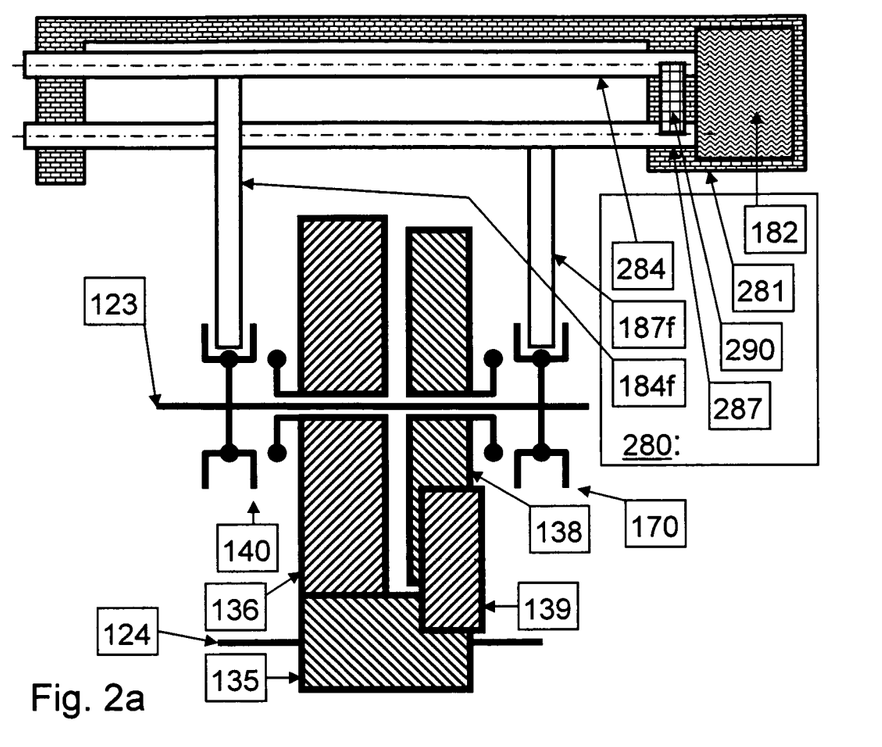

FIG. 2a shows a close-up between the first tooth clutch 140 and reverse tooth clutch 170 of a variant of the transmission 100. Parts that are, or could be, identical are referred by the same numbers. Corresponding, but not identical parts have the same number except for the first digit.

Figure 2B:
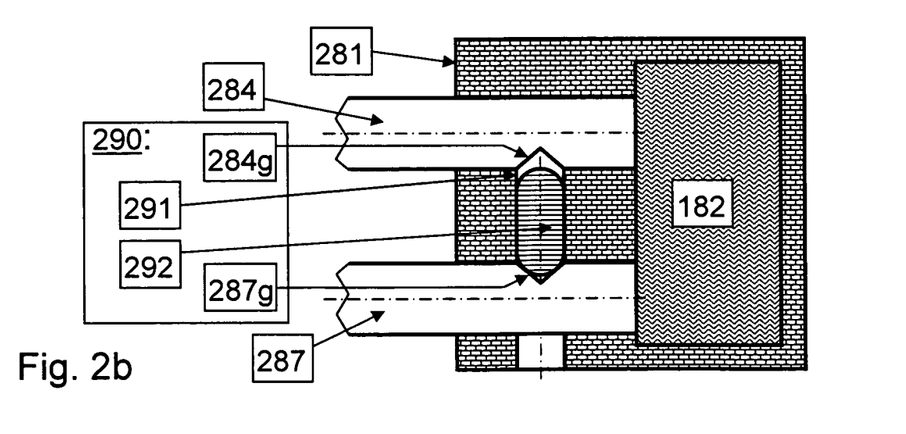

A shift control unit 280 comprises a housing 281, the actuator unit 182, shift rod 284 and shift fork 184*f* for controlling the first tooth clutch 140, shift rod 287 and shift fork 187*f* for reverse tooth clutch 170, and an interlocking device 290. In FIG. 2b, the interlocking device 290 is shown in more detail. In the housing 281, there is a hole 291 that is coplanar with, but perpendicular to, the shift rods 284 and 287. Therein, an interlocking pin 292 is arranged. The shift rods 284 and 287 have grooves 284*g* and 287*g* that are centred with the hole 291 when the tooth clutches 140 and 170 are in neutral position. The length of the interlocking pin 292 is adapted to allow one of the shift rods 284 or 287 to be displaced, i.e., to engage its tooth clutch, so that its groove 284*g* or 287*g* is offset. Then, the interlocking pin 292 would be pushed into the groove of the other shift rod. Thus, this shift rod cannot be displaced. This is a widely used way to prevent shafts from being blocked by simultaneous engagement of two tooth clutches. A corresponding logical expression for that is as follows:

(140engaged) AND (170engaged)

Figure 3A:
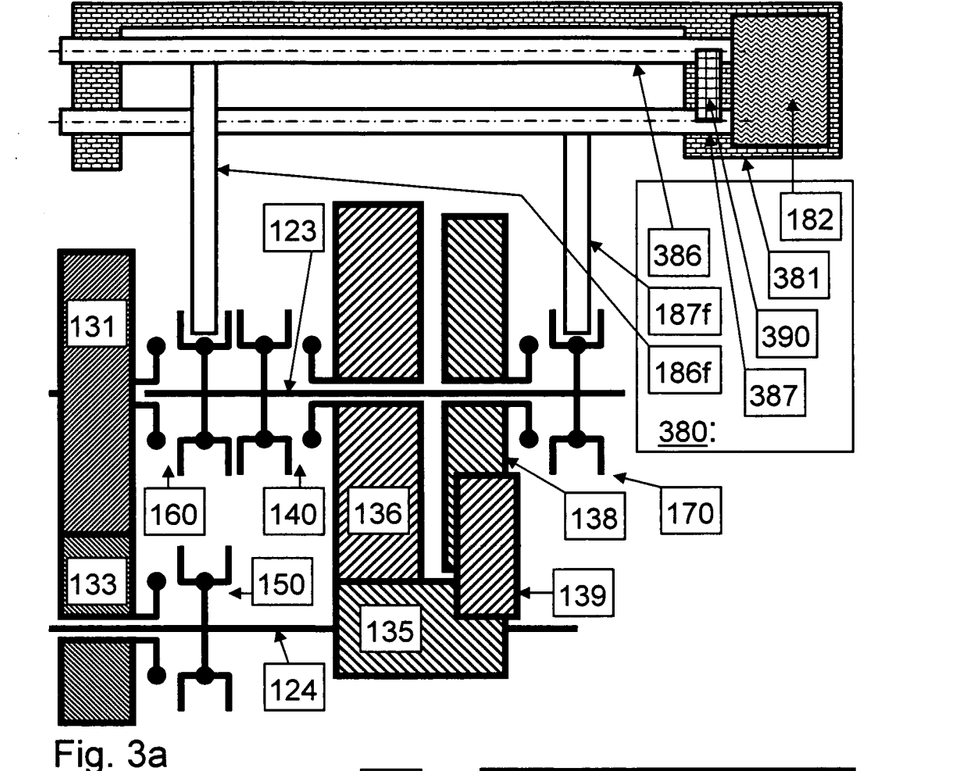
Figure 3B:
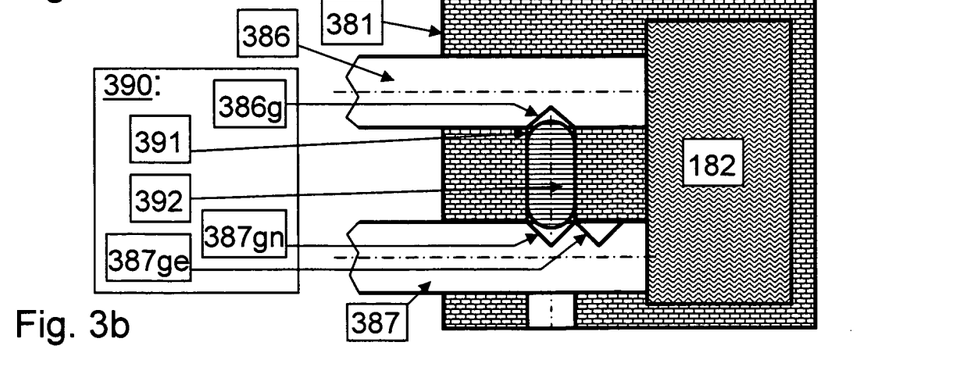

FIGS. 3a and 3b show a similar interlocking device 390 between a modified shift rod 386 for the direct tooth clutch 160 and a modified shift rod 387 for reverse tooth clutch 170. There are two grooves in the shift rod 387; a neutral groove 387*gn* and an engaged groove 387*ge*. The neutral groove 387*gn* is centred with the interlocking pin 392 when the reverse tooth clutch 170 is in neutral position. Similarly, the engaged groove 387*ge* is centred with interlocking pin 392 when reverse tooth clutch 170 is in engaged position.

In neutral position of the reverse tooth clutch, the neutral groove 387*gn* allows the shift rod 386 to be displaced for engaging or disengaging the direct tooth clutch 160. In the same way, the groove 386*g* in the shift rod 386 enables displacement of the shift rod 387. However, if the direct tooth clutch 160 is engaged, the shift rod 387 cannot be displaced. That prevents an engagement of the reverse tooth clutch 170 when driving in gear 3 or 4, which could block the shafts of the transmission. A mode for rocking the vehicle out of snow or mud can be achieved by first engaging the reverse tooth clutch 170, whereafter the engaged groove 387*ge* allows the shift rod 386 to be displaced and engage the direct tooth clutch 160. Unfortunately, there is a big disadvantage with this well-known and simple device for reducing the risk for blocking the shafts. In the rocking mode, it is not possible to disengage the reverse tooth clutch 170, i.e., to displace the shift rod 387. First, the direct tooth clutch 160 must be disengaged in order for the groove 386*g* to be centred with the interlocking pin 392. That can be very annoying when driving away after having rocked the vehicle out of snow or mud. The power transfer to the driven wheels will be interrupted when the direct tooth clutch 160 is disengaged. Then, there is a risk that the wheels will be stuck again.

Figure 4A:
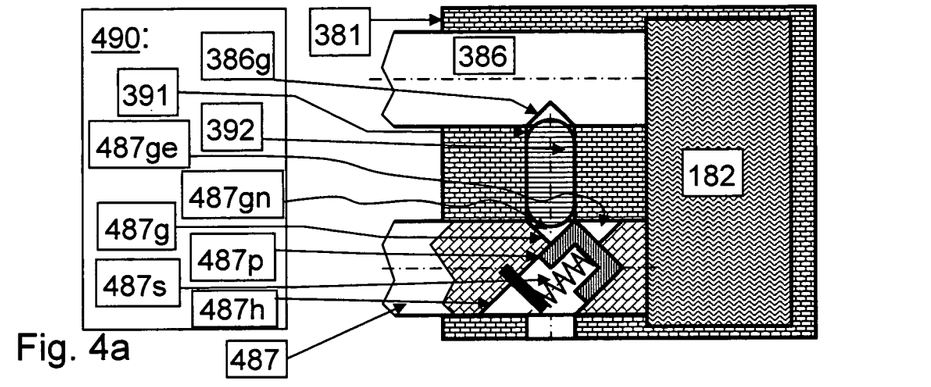
FIGS. 4a to 4c diagrammatically disclose different states of an embodiment of the invention.

FIG. 4a shows a cross section of a modified interlocking device 490 according to the invention for the transmission 100 of FIG. 1a. The reverse tooth clutch 170 is controlled by a modified shift rod 487. There, an element that is a piston element 487*p* partitions a wide groove 487*g* into a first groove 487*gn* and a second groove 487*ge* that corresponds to said grooves 387*ge* and 387*gn*. The piston element 487*p* is slidably arranged in a slanted hole 487*h* in the shift rod 487 and is being pushed towards the groove 487*g* (or grooves 487*ge* and 487*gn*) by a spring element 487*s*. For the rest, the interlocking device 490 is identical to the interlocking device 390 in FIG. 3b.

Figure 4B:
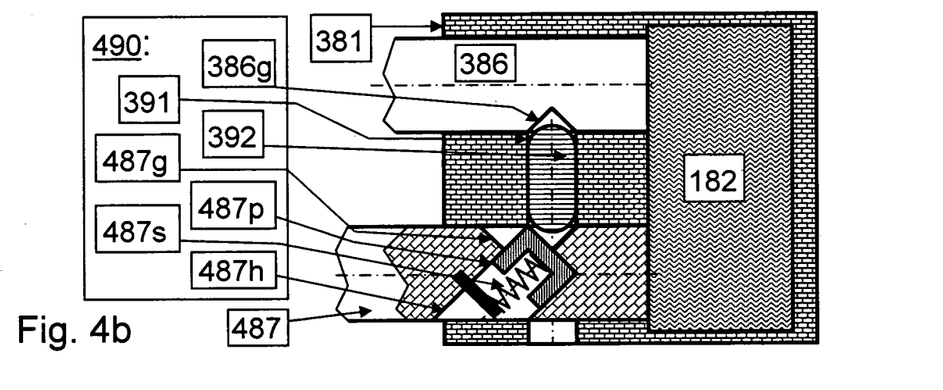

In FIG. 4a, the positions of the shift rods 386 and 487 correspond to neutral positions of the direct tooth clutch 160 and reverse tooth clutch 170. The shift rod 386 can be displaced to engage the direct tooth clutch 160, whereafter a displacement of the shift rod 487 would be blocked by the piston element 487*p*, thereby preventing an engagement of the reverse tooth clutch 170. Similarly, from the neutral positions in FIG. 4a, the shift rod 487 can be displaced to engage the reverse tooth clutch 170. This is shown in FIG. 4b. There, with the right-hand part of the groove 487*g* centred with the interlocking pin 392, the shift rod 386 can be displaced to engage the direct tooth clutch 160 for the rocking mode.

Figure 4C:
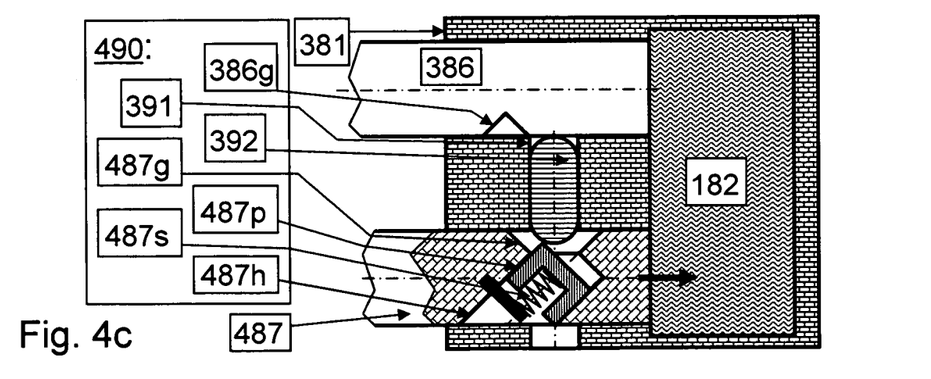

So far, the function of the interlocking device 490 is identical to that of interlocking device 390. However, as shown in FIG. 4c, there is a difference in the rocking mode, where both shift rods 386 and 487 are displaced to the left. The interlocking pin 392 can push the piston element 487*p* down in the slanted hole 487*h*, thus allowing the shift rod 487 to be displaced in the shown example to the right. Thereby, the reverse tooth clutch 170 can be disengaged when the direct tooth clutch 160 is engaged. This makes it possible to leave the rocking mode without interrupting the power transfer to the driven wheels, which is of significant advantage.

So, acting between two tooth clutches, the interlocking device 490 provides prevention from some tooth clutch combinations that would block the shafts of the transmission. In addition, it does not prevent the transmission from being used in a normal way. Moreover, it is a compact, simple and low-cost device. Hence, it fulfils the scope of the invention.

An interlocking device as in FIGS. 4a-4c can have other uses than in the rocking mode. If, for instance, there were more forward gears, as in DE923402 (FIG. 2) or DE3131156A1 (FIG. 1) such aAn interlocking device could be used to prevent a tooth clutch corresponding to gears 1 and 2 to be engaged simultaneously with the tooth clutch for gears s and 6 unless the latter tooth clutch was engaged first. Thereby, it is possible to carry out a down-shift without power interruption from gear S to gear 2, but shafts are prevented from being blocked by an engagement of gear S when driving in gear 1. The invention can be generalized to embody the following for any pair of tooth clutches:

Both tooth clutches can be engaged simultaneously only when one particular tooth clutch was engaged prior to the other.

If both tooth clutches are engaged, it should be possible to disengage any of them.

Figure 5A:
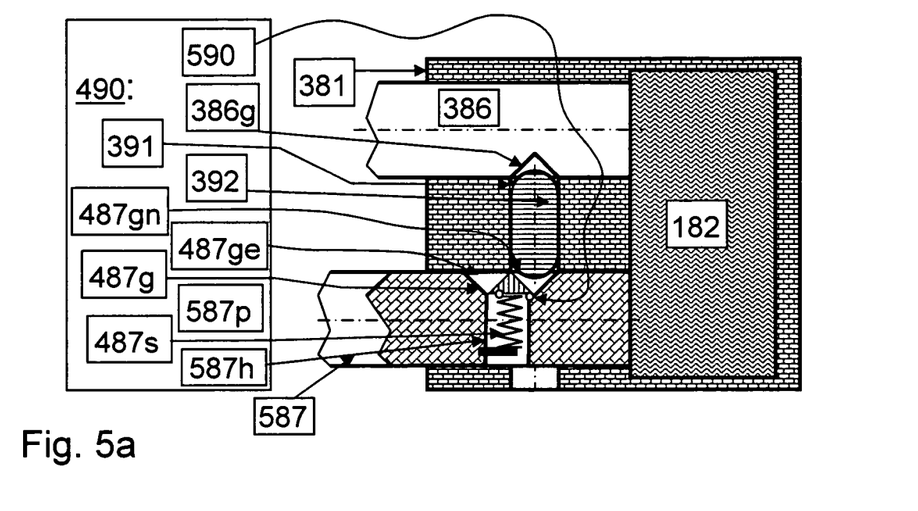
FIGS. 5a and 5b diagrammatically disclose different states of a further embodiment of the invention.
Figure 5B:
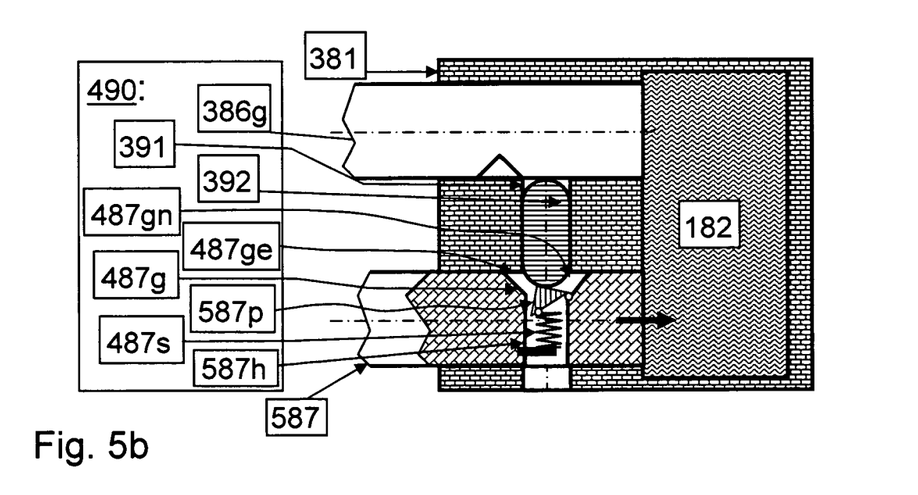

The invention has been described with a certain degree of particularity. However, several variations are possible within the scope of the invention, as is obvious to a person skilled in the art. For instance, the piston element 487*p* may be an element of a lid-like design that is hinged in the right-most end of the hole 487*h* Figures Sa and Sb disclose a further embodiment of the invention with a hinged and lid-like design. FIG. 5*a* corresponds to the embodiment and state disclosed in FIG. 4*b*, that is, shift rod 386 is in neutral position and a modified shift rod S87 is in an engaged position. A modified hole S87*h* is here straight and perpendicular to said shift rods (i.e. not slanted) and the element 587*p* is hinged by a hinge S90 to said shift rod 587. The state in FIG. 5*b* corresponds to the state in FIG. 4*c*.

In a further embodiment of the invention the hole 487*h* may or may not (as in FIGS. 5*a* and 5*b*) be slanted in combination with a hinge design of said element. The hole 391 for the interlocking pin 392 may or may not be a part of the shift control housing 381. The interlocking pin 392 may or may not have a circular cross-section. It may also be composed of more than one part, e.g., a number of balls. There may be spring devices between such parts in order to integrate a detent function that tends to retain the shift rods and tooth clutches in engaged or disengaged position. The grooves 386*g* and 487*g* (487*gn* and 487*ge*) may be straight or turned circumferential.

It shall be noted that the tooth clutches 140, etc., may or may not have synchronizing parts in order to facilitate engagement, as is readily known by a person skilled in the art.

The invention would be equally applicable on transmission designs with hinged, so-called rocking shift forks that are not firmly fixed to shift rods. Moreover, the parts with a groove (386*g*, 487*g*, 487*gn*, 487*ge*), do not have to move linearly. A rotating motion, or a combination of linear and rotating motion, would be possible, as recognized by a person skilled in the art.

The invention should not be deemed to be limited to the embodiments described above, but rather a number of further variants and modifications are conceivable within the scope of the following patent claims.

The invention claimed is:

1. An interlocking device arranged to prevent forbidden order of engagement/disengagement of two tooth clutches in a vehicle transmission, where each tooth clutch when in an engaged position is arranged to rotationally lock a first shaft to a gearwheel or to a second shaft and when in a disengaged position to rotationally unlock the first shaft from the gearwheel or the second shaft, where for each tooth clutch a shift rod is arranged to push the tooth clutch between the engaged position and the disengaged position, and where the interlocking device comprises:

a groove arranged in a first of the shift rods, and a second and a third groove arranged in a second of the shift rods, an interlocking element arranged coplanar with the shift rods, and directed and movable towards the shift rods;

and where a length of the interlocking element is adapted to allow certain combinations and order of engagement/disengagement of the tooth clutches, wherein an element partitions the second and third groove and where the element is movably arranged in a hole in the second shift rod such that the interlocking element can push the element down in the hole, allowing the second shift rod to be displaced only one-way when the first shift rod is in an engaged position.

2. The interlocking device as in claim 1, wherein the hole is slanted.

3. The interlocking device as in claim 2, wherein the element is a piston slidably arranged in the slanted hole.

4. The interlocking device as in claim 1, wherein the hole is straight and perpendicular to the shift rods.

5. The interlocking device as in claim 2, wherein the element is hinged to the second shift rod by a hinge.

6. The interlocking device as in claim 5, wherein the element is of a lid-like design.

7. The interlocking device as in claim 1, wherein the element is pushed towards the grooves by a spring element.

8. The interlocking device as in claim 1, wherein the interlocking element is an interlocking pin.

* * * * *